July 26, 1932.   A. A. BUSH   1,869,322

CHUCK

Filed Feb. 28, 1930

INVENTOR
ALBERT A. BUSH.

BY Ely & Barrow

ATTORNEYS.

Patented July 26, 1932

1,869,322

UNITED STATES PATENT OFFICE

ALBERT A. BUSH, OF AKRON, OHIO, ASSIGNOR TO THE FIRESTONE TIRE & RUBBER COMPANY, OF AKRON, OHIO, A CORPORATION OF OHIO

CHUCK

Application filed February 28, 1930. Serial No. 432,011.

This invention relates to chucks and more particularly to chucks adapted to receive relatively small drills and engraving tools.

It is an object of the invention to provide an efficient, inexpensive, firmly gripping chuck in which a tool may be quickly and easily clamped and unclamped.

A further object of the invention resides in the provision of an easily replaceable thread between the chuck members which also serves as a locking means.

The above and other objects of the invention are achieved by the chuck illustrated in the accompanying drawing and described below, it being understood that the invention is not limited to the specific form thereof shown and described.

Figure 1:
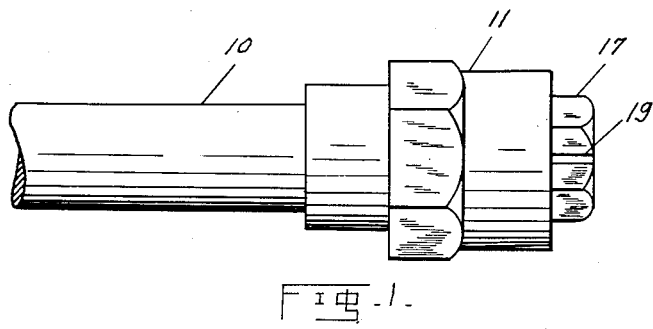
Figure 1 is a side elevation of a chuck embodying the invention.
Figure 2:
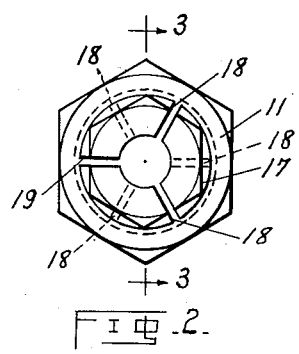
Figure 2 is an end elevation of Figure 1.
Figure 3:
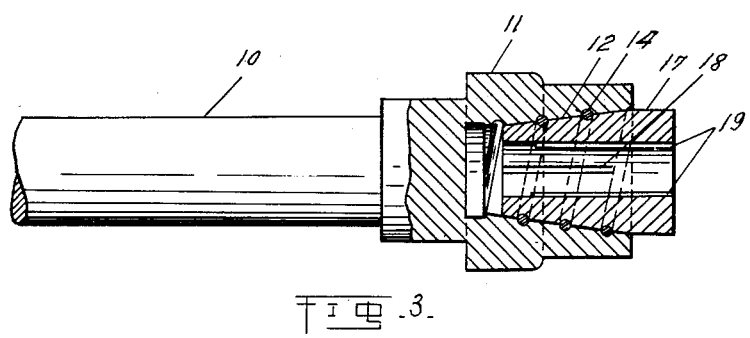
Figure 3 is a view similar to Figure 1, but broken away on the line 3—3 of Figure 2 to show the interior construction thereof.
Figure 4:
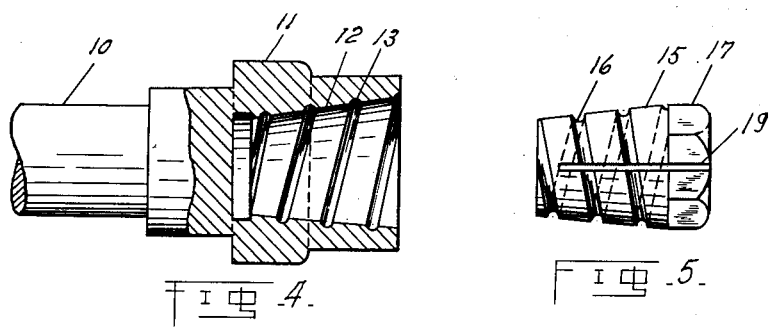
Figure 4 is a view similar to Figure 3 but of the spindle and socket alone.
Figure 5:
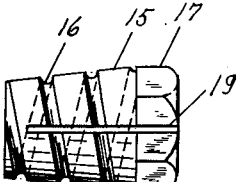
Figure 5 is a side elevation of the collet alone.
Figure 6:
Figure 6 is a side elevation of the spring thread incorporated in the invention.

In the drawing the numeral 10 indicates a spindle to which is fixed an enlarged socket 11 having a tapered bore 12. A spiral groove 13 cut in the bore 12 receives a spiral spring 14.

The socket 11 is adapted to receive a collet 15 formed with a spiral groove 16 which cooperates with the spring 14 held in the socket 11. Means to rotate the collet relatively to the spindle may take the form of a hexagonal nut 17 formed integral with the end of the collet. The collet is adapted to give radially upon being screwed into the socket 11 so that it clamps about a tool (not shown) inserted therein. For this purpose the collet may be slotted from one end as at 18 and from the other end as at 19.

From the foregoing description the operation of the chuck will be evident. While the tool is held very tightly and securely in the chuck the operator can quickly and easily replace it by loosening and closing the collet with a small wrench. The spring 14 while serving primarily as a hardened, easily replaceable thread, also acts to some extent as a locknut between the collet and its socket.

As many changes could be made in the construction it is intended that all matter contained in the above description or shown in the accompanying drawing shall be interpreted as illustrative only and not in a limiting sense, accordingly various modifications and applications of the invention can be resorted to without departing from the spirit of the invention or the scope of the appended claims.

What is claimed is:

1. In combination in a chuck, a spindle, a socket fixed at the end of said spindle, said socket having a tapered bore with a half round spiral groove therein, a coiled spring of round wire of a diameter equal to that of the groove received in the spiral groove, and a tapered collet having a half round spiral groove adapted to cooperate with the spring received in the socket, said collet having a plurality of longitudinal slots therein extending from opposite ends and terminating short of the end of the collet whereby the collet may be radially compressed to clamp on a tool when it is screwed into the socket.

2. In a chuck, a socket having a tapered bore, a tapered collet received in said socket, screw means between the socket and said collet comprising a spiral conical spring cooperating with grooves in the surface of the socket bore and in the tapered surface of the collet, said collet having a plurality of longitudinal slots therein extending from opposite ends and terminating short of the end of the collet whereby the collet may be radially compressed to clamp on a tool when it is screwed into the socket, and a nut formed integral with the collet for rotating the collet with respect to the socket.

3. In a chuck, a socket having a tapered bore, a tapered collet received in said socket, and screw means between the socket and said collet comprising a spiral conical spring cooperating with grooves in the surface of the socket bore and in the tapered surface of the collet, said collet having a plurality of longitudinal slots therein extending from opposite ends and terminating short of the end of the collet whereby the collet may be radially compressed to clamp on a tool when it is screwed into the socket.

4. In a chuck, a socket having a tapered bore, a tapered collet received in said socket, screw means between the socket and said collet comprising a spiral conical spring co-ooperating with grooves in the surface of the socket bore and in the tapered surface of the collet, said collet having a plurality of longitudinal slots therein extending from opposite ends and terminating short of the end of the collet whereby the collet may be radially compressed to clamp on a tool when it is screwed into the socket, and means for rotating the collet with respect to the socket.

ALBERT A. BUSH.